(12) United States Patent
Yang et al.

(10) Patent No.: US 11,434,656 B2
(45) Date of Patent: Sep. 6, 2022

(54) COLLAPSIBLE CANOPY WITH MOBILITY DEVICE

(71) Applicants: Shengyong Yang, Shanghai (CN); Jing Bian, Shanghai (CN)

(72) Inventors: Shengyong Yang, Shanghai (CN); Jing Bian, Shanghai (CN)

(*) Notice: Subject to any disclaimer, the term of this patent is extended or adjusted under 35 U.S.C. 154(b) by 0 days.

(21) Appl. No.: 15/947,792

(22) Filed: Apr. 7, 2018

(65) Prior Publication Data
US 2019/0309537 A1 Oct. 10, 2019

(51) Int. Cl.
*E04H 15/50* (2006.01)
*E04H 15/46* (2006.01)
*B60B 19/12* (2006.01)

(52) U.S. Cl.
CPC ........... *E04H 15/505* (2013.01); *E04H 15/46* (2013.01); *B60B 19/12* (2013.01)

(58) Field of Classification Search
CPC ......... E04H 15/50; E04H 15/46; E04H 15/44; E04H 15/32; E04H 6/04; E04H 15/405; E04H 15/505; A63B 60/62; A63B 55/404; B60B 19/12
USPC ........ 135/128, 130–131, 139–140, 143–145, 135/120.1; 297/184.1, 184.15, 188.2, 297/46–47, 16.1–16.2, 16.1–16.2; 150/159; 224/153, 158, 186
See application file for complete search history.

(56) References Cited

U.S. PATENT DOCUMENTS

| | | | | |
|---|---|---|---|---|
| 4,779,635 A | * | 10/1988 | Lynch | E04H 15/50 135/145 |
| 5,511,572 A | * | 4/1996 | Carter | E04H 15/50 135/145 |
| 5,975,170 A | * | 11/1999 | Anguiano | A63B 55/406 150/159 |
| 6,361,057 B1 | * | 3/2002 | Carter | B62B 1/14 135/912 |
| 7,673,643 B2 | * | 3/2010 | Seo | E04H 15/32 135/120.1 |
| 10,253,523 B2 | * | 4/2019 | Volin | E04H 15/18 |
| 2002/0074032 A1 | * | 6/2002 | Park | E04H 15/50 135/131 |
| 2010/0282381 A1 | * | 11/2010 | Badertscher | E05B 73/0005 150/159 |
| 2012/0325279 A1 | * | 12/2012 | Munoz | B08B 15/026 135/93 |
| 2015/0183352 A1 | * | 7/2015 | Bowe | A47D 15/00 297/184.11 |
| 2015/0202108 A1 | * | 7/2015 | Kilian | A61G 99/00 27/1 |
| 2016/0060896 A1 | * | 3/2016 | Toohey | E04H 15/32 135/120.1 |
| 2017/0296890 A1 | * | 10/2017 | Maguire | A63B 55/00 |

* cited by examiner

*Primary Examiner* — Noah Chandler Hawk
(74) *Attorney, Agent, or Firm* — John R. Ross; John R. Ross, III

(57) ABSTRACT

A wheeled collapsible canopy with foldable support frame. The wheeled collapsible canopy includes at least two wheeled legs and also at least two non-wheeled legs. A protective cover covers the top of the collapsible canopy when the collapsible canopy is in a folded state. The protective cover extends only partially down the length of the folded support frame.

5 Claims, 14 Drawing Sheets

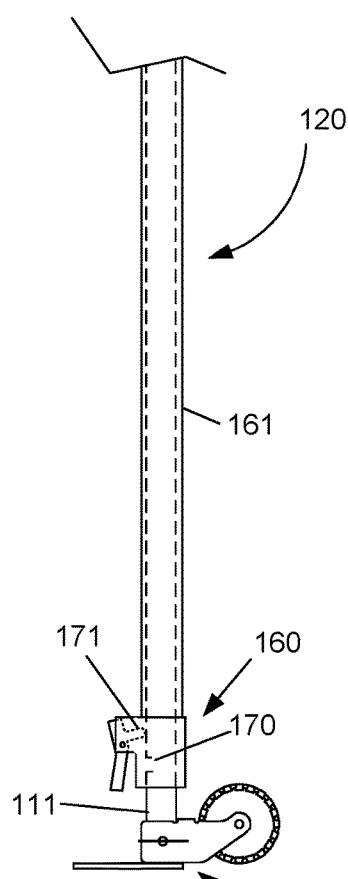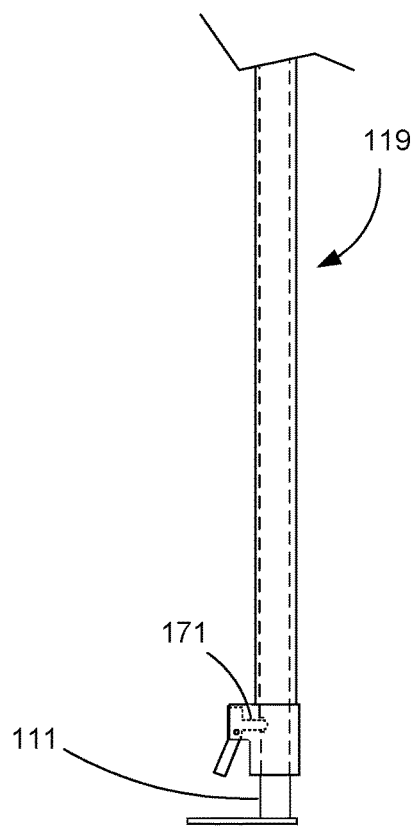
FIG. 7
FIG. 9
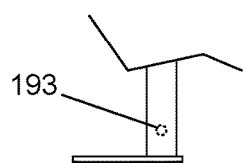
FIG. 8

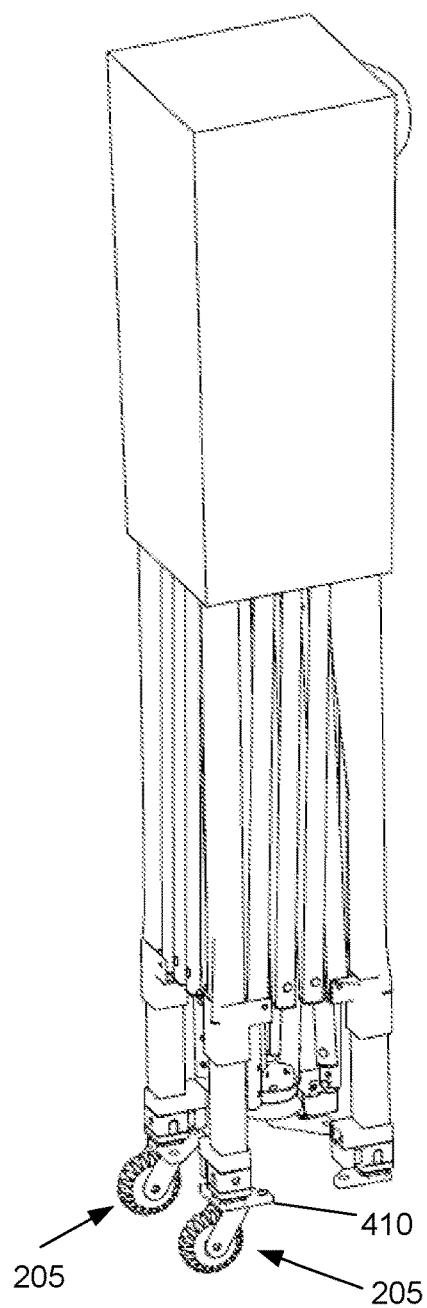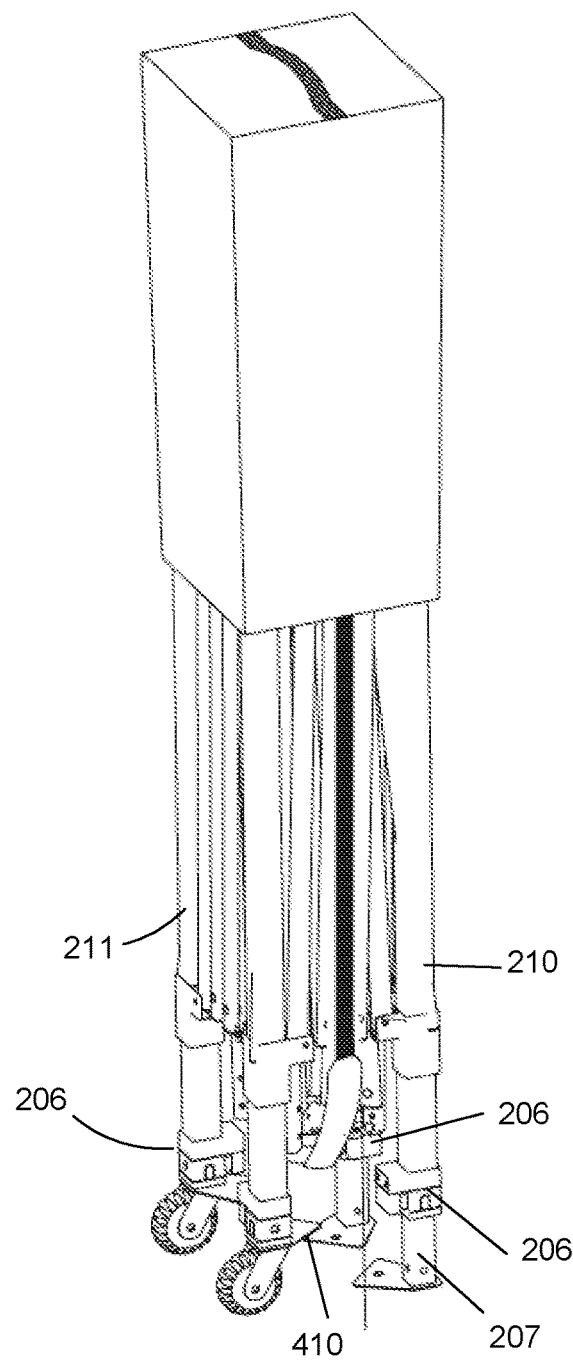
FIG. 10
FIG. 11

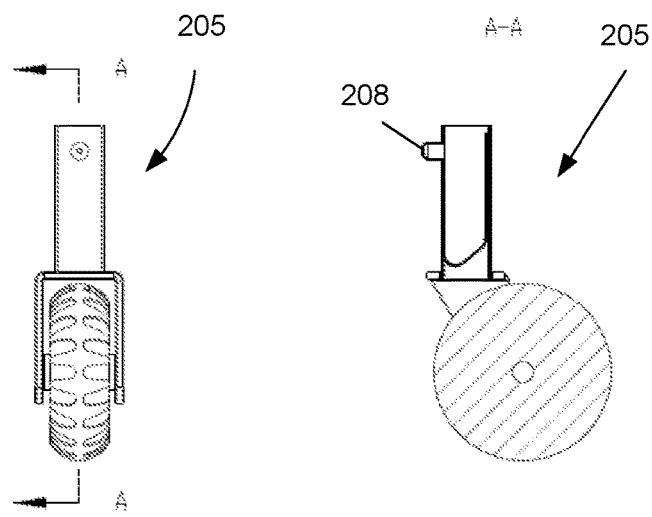
FIG. 12
FIG. 13
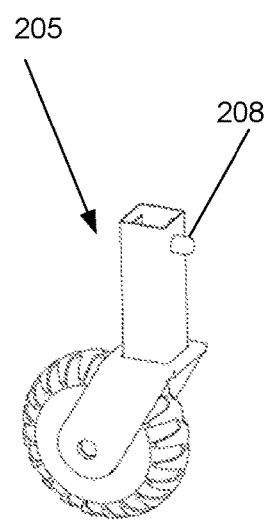
FIG. 14

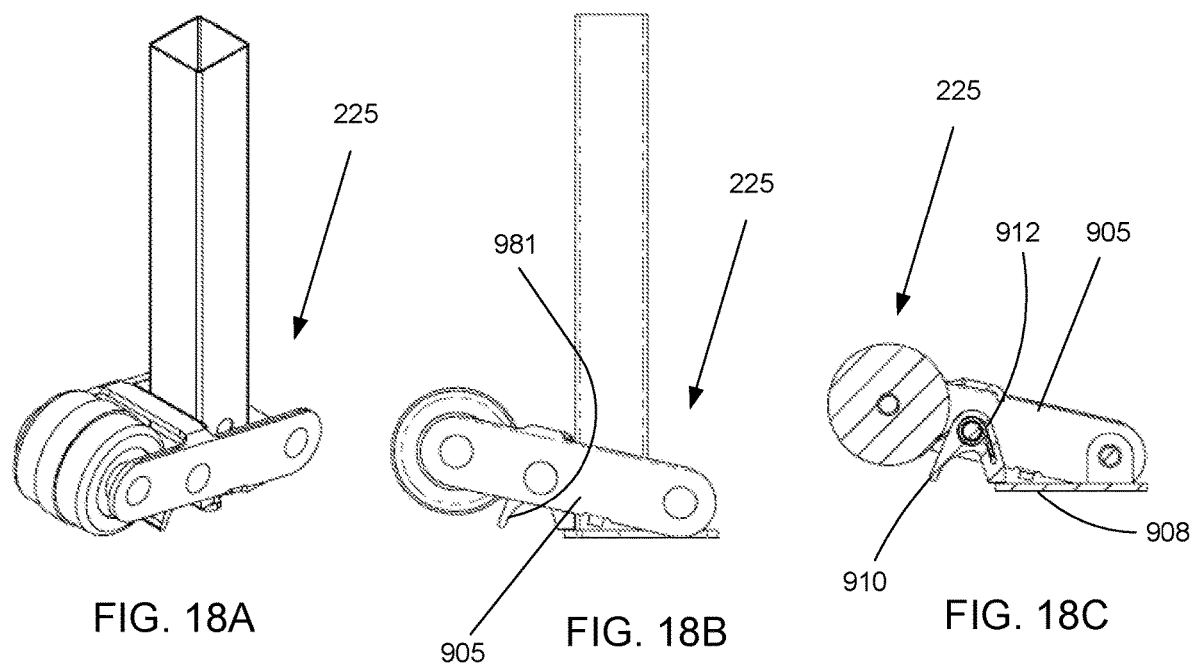

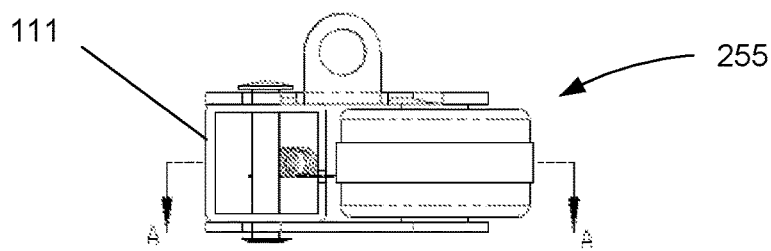
FIG. 19B
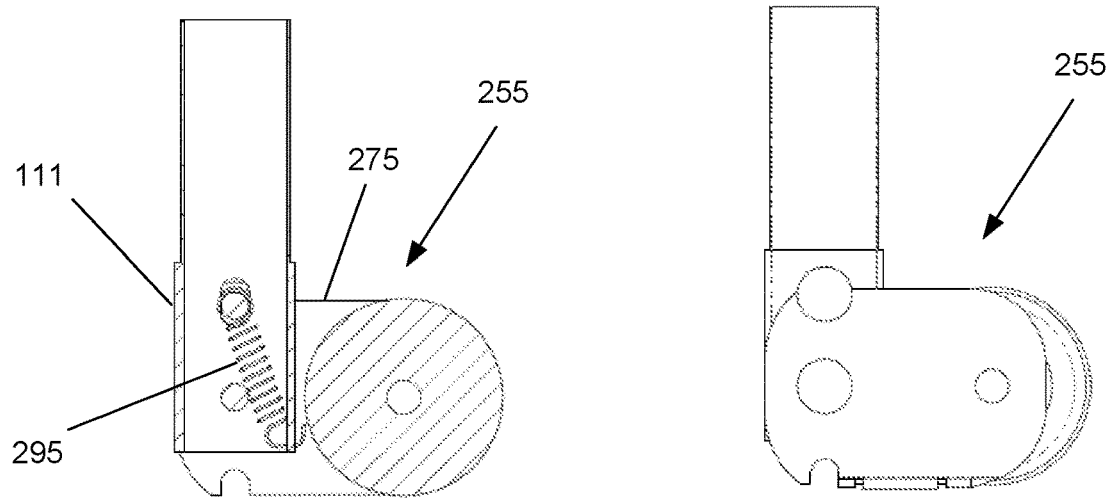
FIG. 20
FIG. 21
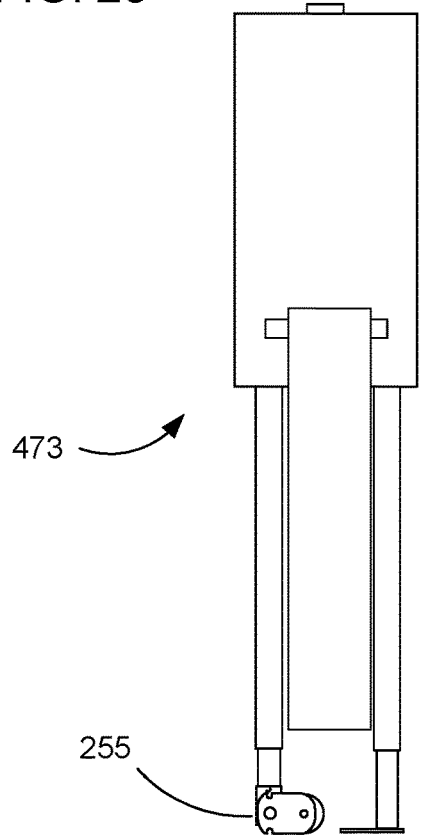
FIG. 19A

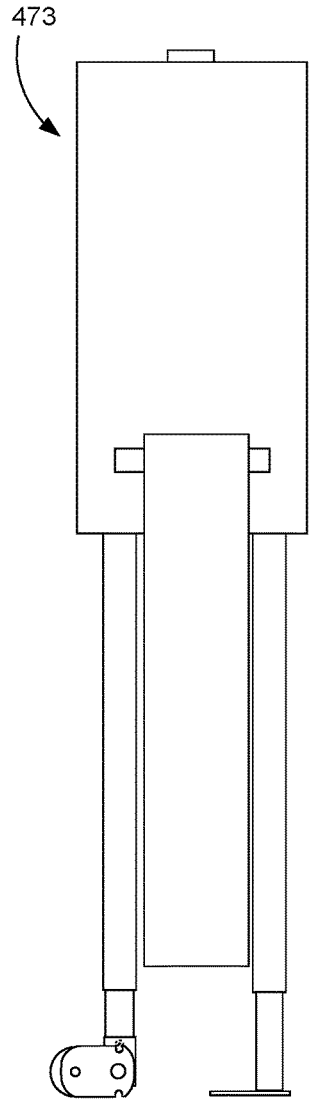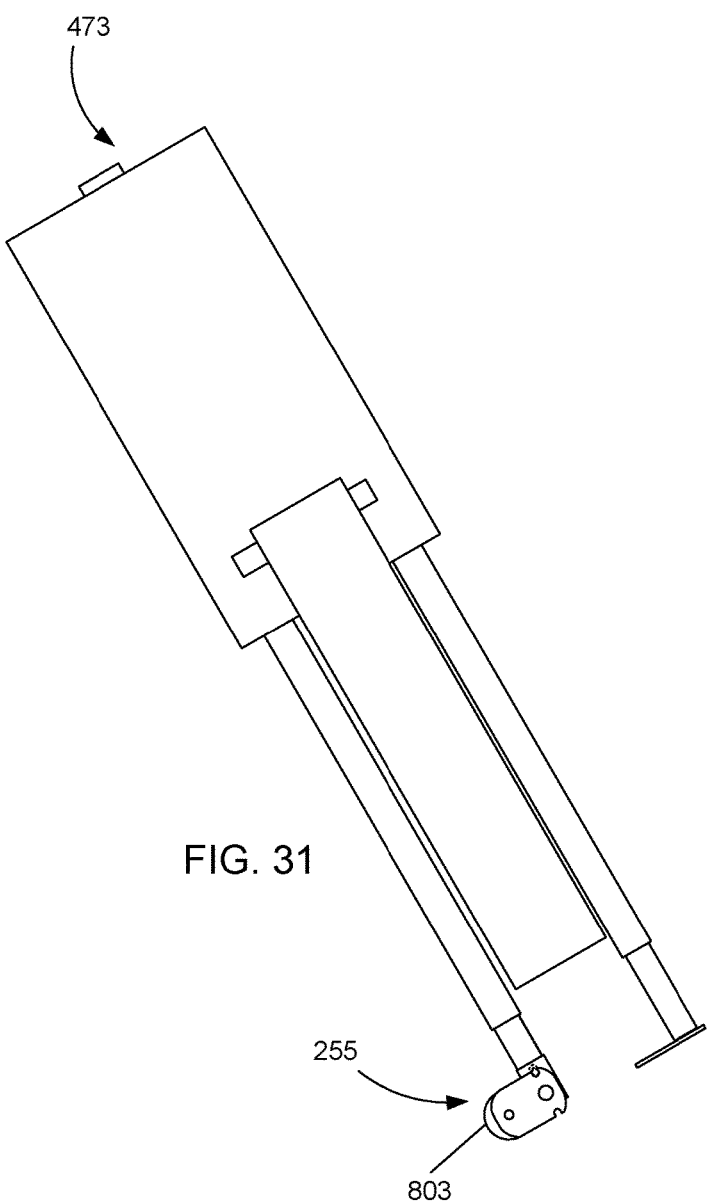
FIG. 30
FIG. 31

COLLAPSIBLE CANOPY WITH MOBILITY DEVICE

The present invention relates to collapsible canopies, and in particular, to mobility devices for collapsible canopies.

BACKGROUND OF THE INVENTION

Collapsible canopies that are capable of being locked into an unfolded position are very popular in modern society. Generally, each canopy comprises a foldable canopy frame and a canopy fabric, the canopy frame consists of a roof frame and four or more supporting legs, the supporting legs are used for supporting the roof frame and are generally provided with a locking structure on each supporting leg respectively, the canopy fabric covers the roof frame and is used for sunshading, rain sheltering or wind sheltering. The supporting legs are extendable to approximately twice their stowed length.

Collapsible canopies are utilized for shade and shelter purposes when the canopy is in an unfolded state. When it is time to move the canopy, the user will fold the collapsible canopy to a folded state so that it can be more easily transported. In the prior art the user will generally stuff the folded canopy into a transport bag. The transport bag usually has wheels so that the user can pull the canopy rather than having to lift it. Unfortunately, it can be time consuming and difficult to stuff the folded, collapsed canopy into the transport bag. Often the transport bag will rip and tear with age and usage.

What is needed is an improved collapsible canopy that allows for more efficient transportation of the collapsible canopy.

SUMMARY OF THE INVENTION

The present invention provides a wheeled collapsible canopy with foldable support frame. The wheeled collapsible canopy includes at least two wheeled legs and also at least two non-wheeled legs. A protective cover covers the top of the collapsible canopy when the collapsible canopy is in a folded state. The protective cover extends only partially down the length of the folded support frame.

BRIEF DESCRIPTION OF THE PREFERRED EMBODIMENTS

FIGS. 1-9 show a first preferred embodiment of the present invention.

FIGS. 10-14 show a second preferred embodiment of the present invention.

FIGS. 15A-18E show a third preferred embodiment of the present invention.

FIGS. 19A-31 show a fourth preferred embodiment of the present invention.

DETAILED DESCRIPTION OF THE PREFERRED EMBODIMENTS OF THE PRESENT INVENTION

Figure 1:
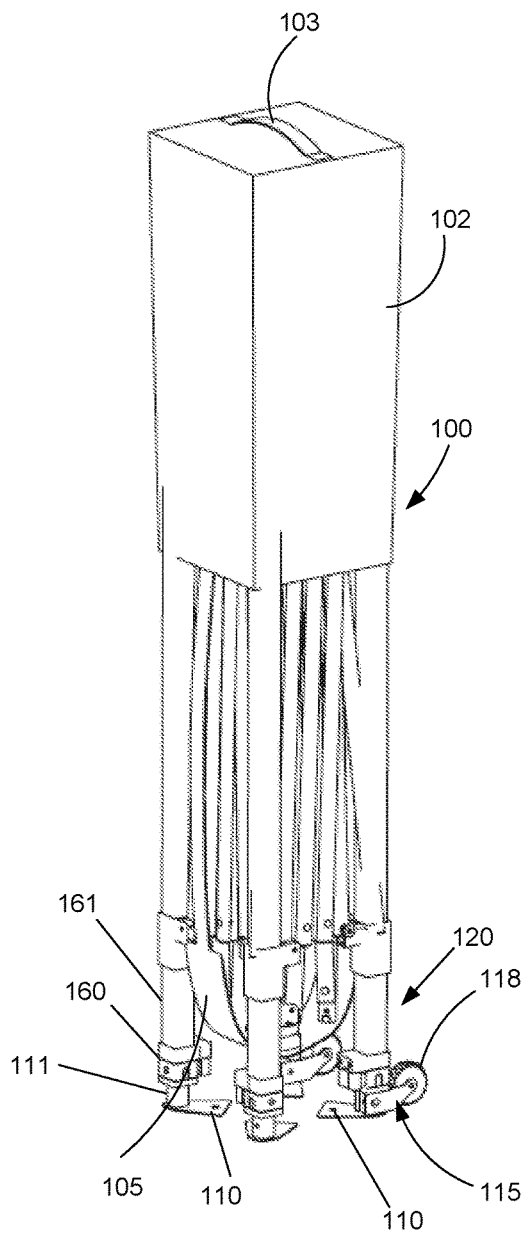
Figure 2:
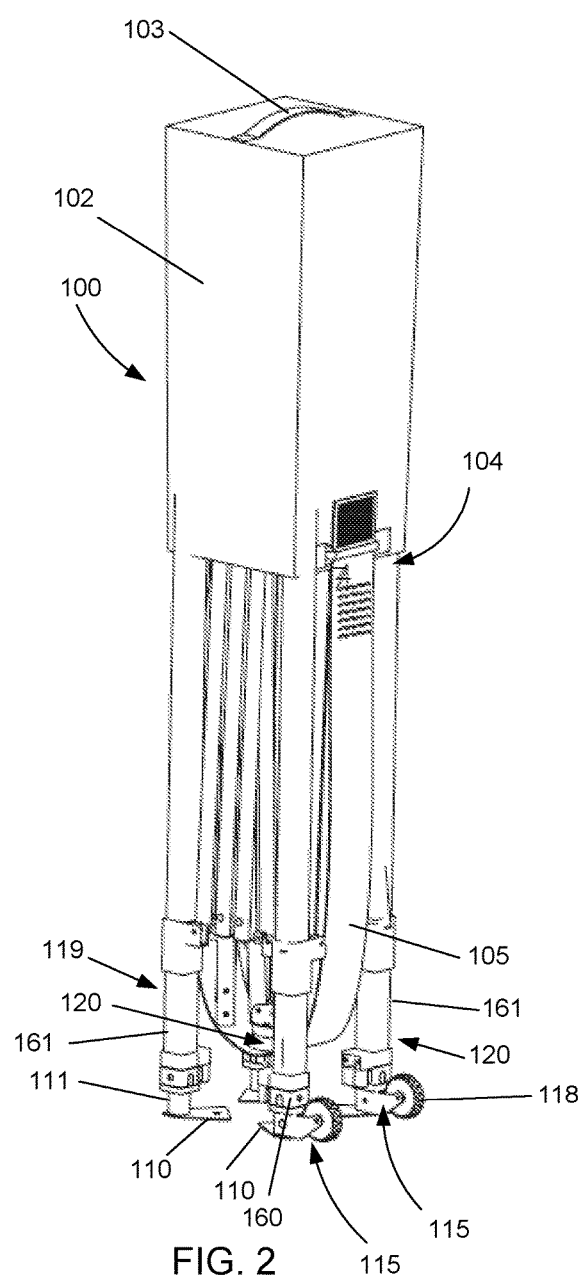
Figure 3:
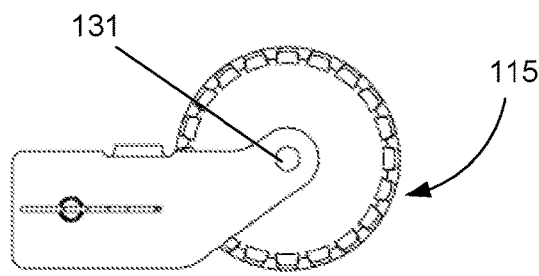
Figure 4:
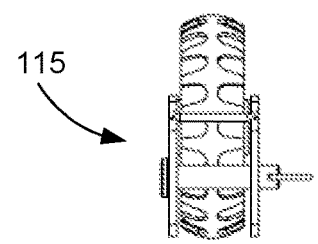
Figure 5:
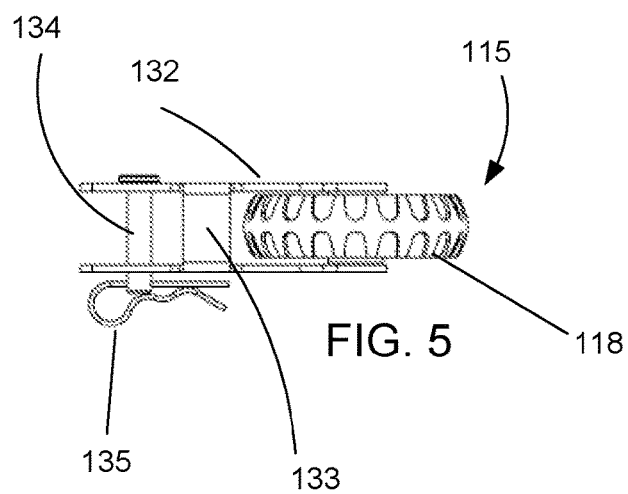
Figure 6:
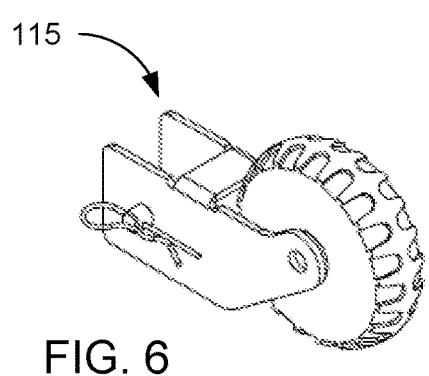

FIGS. 1 and 2 show collapsible canopy 100 in a folded state. Feet 110 support canopy 100 upright as shown. To transport canopy 100, the user will tilt the canopy and pull it while walking. Canopy 100 will roll on wheels 118 of wheeled mechanism 115. Because two canopy legs include wheels 118 of wheeled mechanism 115, it is unnecessary to stuff collapsed canopy 100 into a transport bag having wheels. Instead only a much smaller protective cover is utilized. This greatly reduces the amount of time and work required to fold and then transport the collapsed canopy.

In FIGS. 1 and 2, protective cover 102 has been slid over the top of collapsible canopy 100. Protective cover 102 extends only partially down from the top of collapsible canopy 100. This makes it much easier to install and remove protective cover 102 from collapsible canopy 100. Strap 105 secures protective cover 102 on top of canopy 100. Strap 103 includes hook and loop fastener 104 for securing strap 5 as shown. Handle 103 permits a user to easily pull canopy 100 during transportation.

Horizontal feet 110 are welded to the bottom of extendable legs 111 to allow for greater stability of canopy 100. For wheeled legs 120 and for non-wheeled legs 119, spring loaded position locking clips 160 are rigidly connected to the bottom ends of outer leg sleeves 161. For both wheeled legs 120, wheel mechanisms 115 is connected to inner telescoping extendable leg 111 immediately above each foot 110. Wheel mechanisms 115 allow the user to tilt canopy 100 while canopy 100 is in its folded state. The user can then pull canopy 100 by grasping handle 103 and walking. Canopy 100 will then easily roll while supported by wheels of 118 of wheel mechanisms 115.

FIGS. 3-6 show detailed views of wheel mechanism 115. Wheel mechanism 115 includes wheel 118 rotatably connected via axle 131 to horizontal wheel bracket 132. Stabilizing brace 133 is rigidly connected to horizontal extension 132. Connection bolt 134 extends through horizontal wheel bracket 132 is secured by cotter pin 135.

FIG. 7 shows wheeled mechanism attached to the bottom of extendable leg 111 and positioned immediately above foot 110. To connect wheeled mechanism 115, the user inserts connection bolt 134 through hole 193 (FIG. 8) and secures connection bolt 134 with cotter pin 135 as described above.

In FIG. 7, spring loaded position locking clip 160 is connected to the bottom of outer leg sleeve 161. However, extendable leg 111 is not yet locked into position. To lock extendable leg 111 into position the user moves wheeled mechanism 115 upwards until opening 170 is aligned with knob 171. For example, in FIG. 9, for wheeled leg 120 and non-wheeled leg 119, opening 170 is aligned with knob 171, thereby locking extendable leg 111 into place as shown. It should be noted that locking clips 160 allow the user to lock into place the height of non-wheeled legs 119 so that they match the heights of wheeled legs 120, as shown in FIGS. 9, 1 and 2.

Second Preferred Embodiment

A second preferred embodiment of the present invention is shown in FIGS. 10-14. In the second preferred embodiment wheeled mechanism 115 has been replaced with wheeled mechanism 205. Wheeled mechanism 205 attaches to the bottom of extendable legs 207 for two of the extendable legs, as shown. Non-wheeled legs 210 include spring loaded position locking clips 206 to lock extendable leg 207 in position so that the height of non-wheeled legs 210 is equal to the height of wheeled legs 211.

FIGS. 12-14 show other views of wheeled mechanism 205. Horizontal support feet 410 each include an aperture for receiving wheeled mechanism 205. Wheeled mechanism 205 includes spring loaded push pin 208 for locking wheeled mechanism 205 into place into extendable leg 207.

Third Preferred Embodiment

A third preferred embodiment of the present invention is shown in FIGS. 15A-18E. In the third preferred embodiment wheeled mechanism 115 has been replaced with wheeled mechanism 225. Wheeled mechanism 225 attaches to the bottom of extendable legs 111 for two of the extendable legs to form two wheeled legs. As with the earlier embodiments, there are also two non-wheeled legs.

Figure 15A:
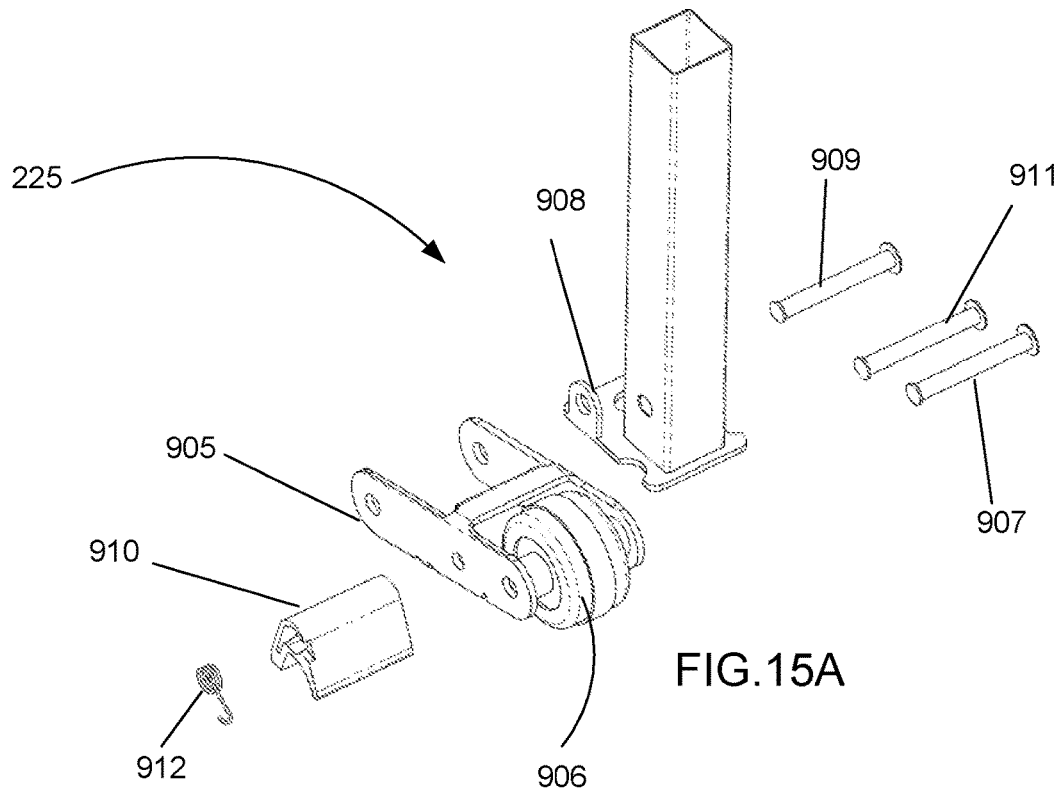

FIG. 15A shows an exploded view of wheeled mechanism 225. Wheeled mechanism 225 includes wheel bracket 905. Wheel bracket 905 is rotatably connected to foot 908 via axle 909. Wheel 906 is rotatably connected to wheel bracket 905 via axle 907. Spring loaded locking clip 910 is rotatably connected to wheel bracket 905 via axle 911. Spring 912 is housed within locking clip 910 and is biased to keep locking clip 910 in the position shown in FIGS. 15C and 18C.

FIGS. 15B-18C show the movement of wheeled mechanism from a preferred stowage position to a preferred position for mobility.

Figure 15B:
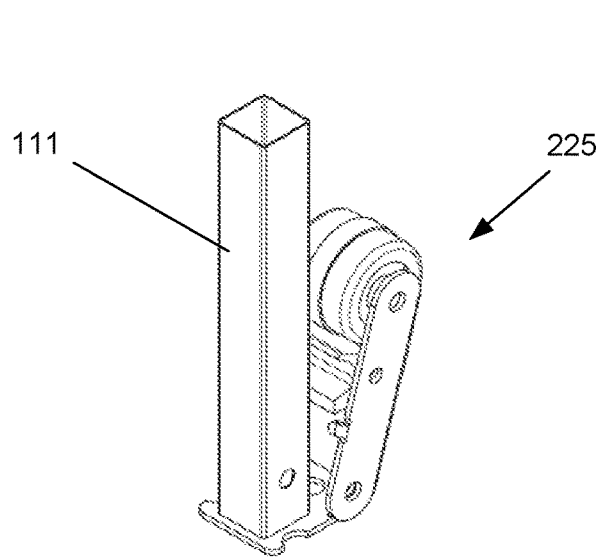
Figure 15C:
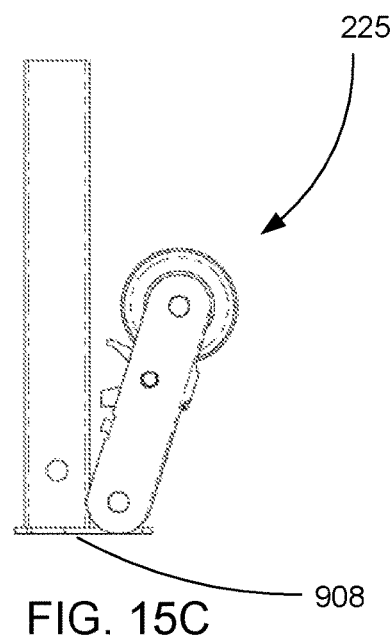

FIGS. 15B-15C shows wheeled mechanism 225 rotatably connected to foot 908 of inner extendable leg 111.

Figure 16A:
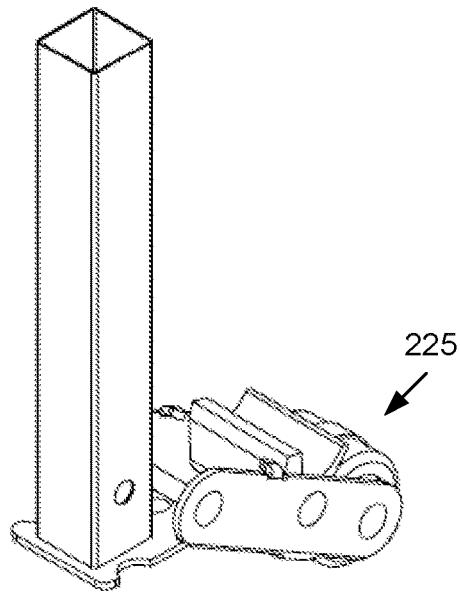
Figure 16B:
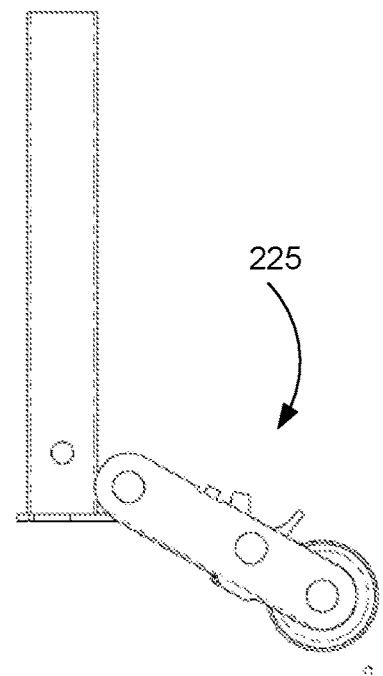

In FIGS. 16A-16B the user has begun to rotate wheeled mechanism 225 clockwise.

Figure 16C:
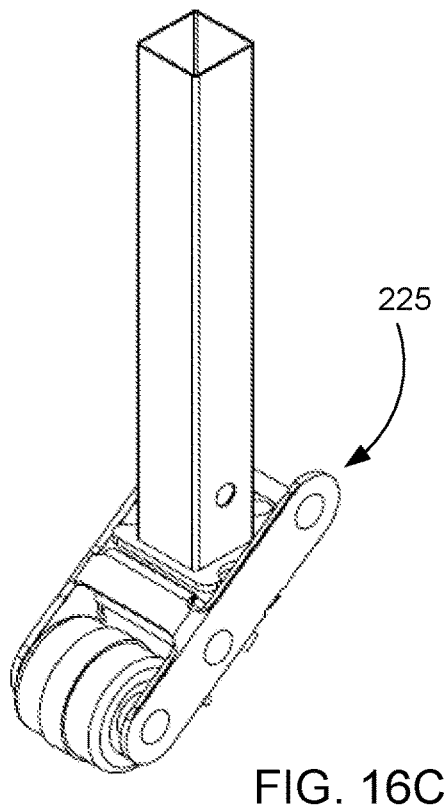
Figure 16D:
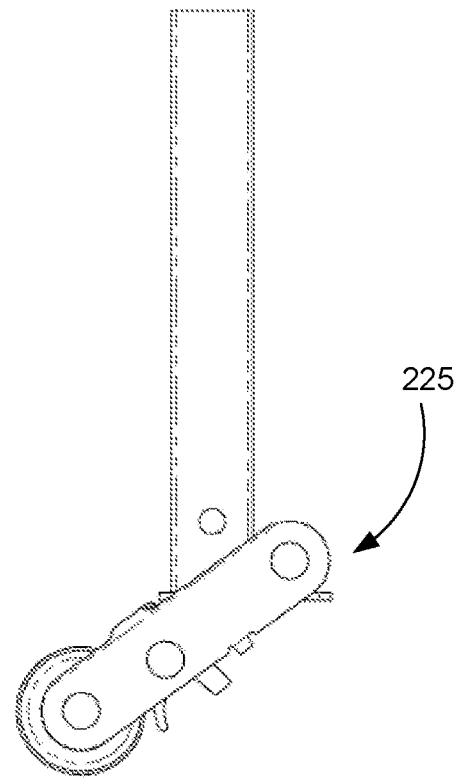

In FIGS. 16C-16D the user has continued the clockwise rotation of wheeled mechanism 225.

Figure 17A:
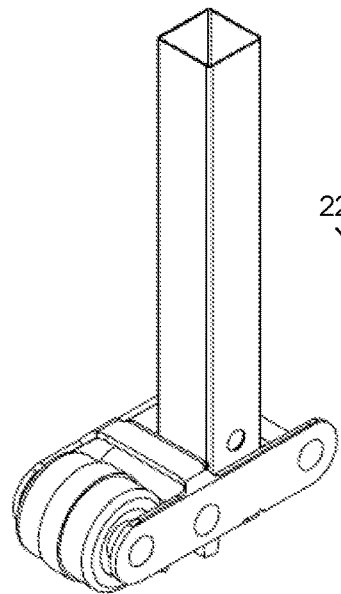
Figure 17B:
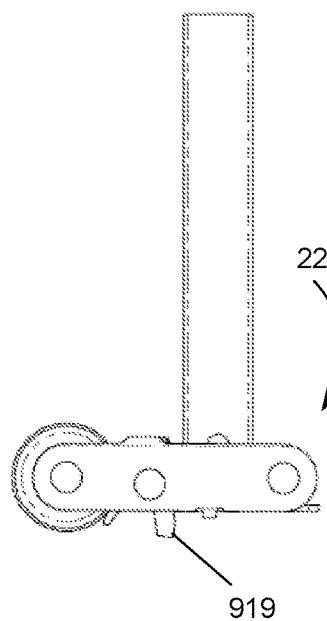
Figure 17C:
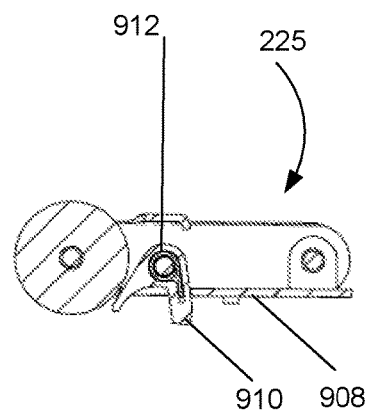

In FIGS. 17A-17C the user has further continued the clockwise rotation of wheeled mechanism 225. Locking clip 910 has run abut foot 908, causing it to rotate clockwise against the bias provided by spring 912.

Figure 17D:
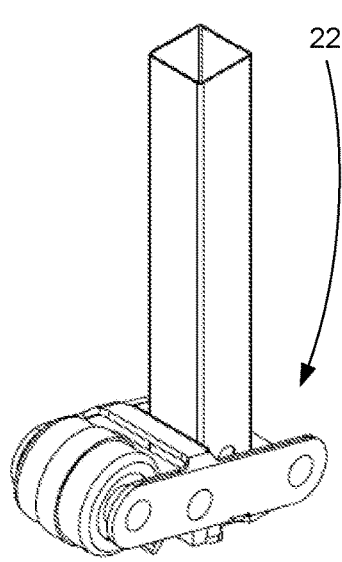
Figure 17E:
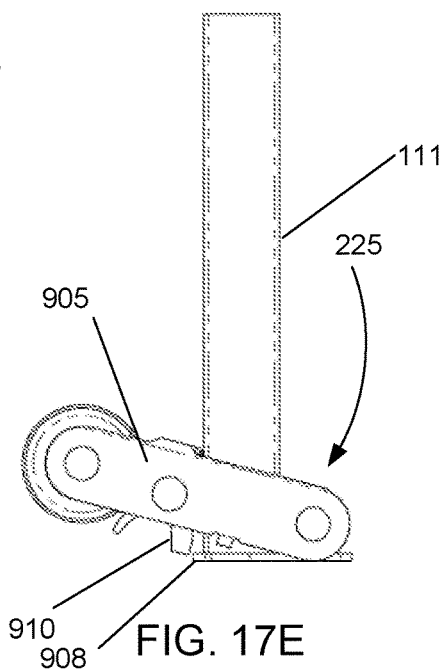
Figure 17F:
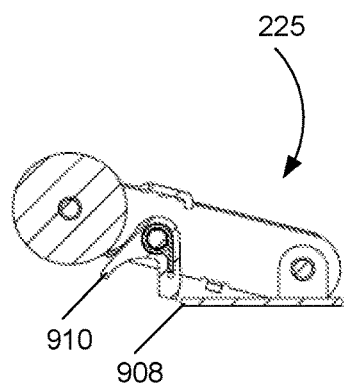

In FIGS. 17D-17F the user has further continued the clockwise rotation of wheeled mechanism 225. Locking clip 910 is shown just as it clears foot 908. Wheel bracket 905 has run abut inner extendable leg 111 to prevent further rotation of wheel bracket 905.

In FIGS. 18A-18C, spring 912 has rotated locking clip 910 counterclockwise so that locking clip 910 is now wedged above foot 908, thereby locking wheel bracket 905 into the position shown.

Figures 18D, 18E:
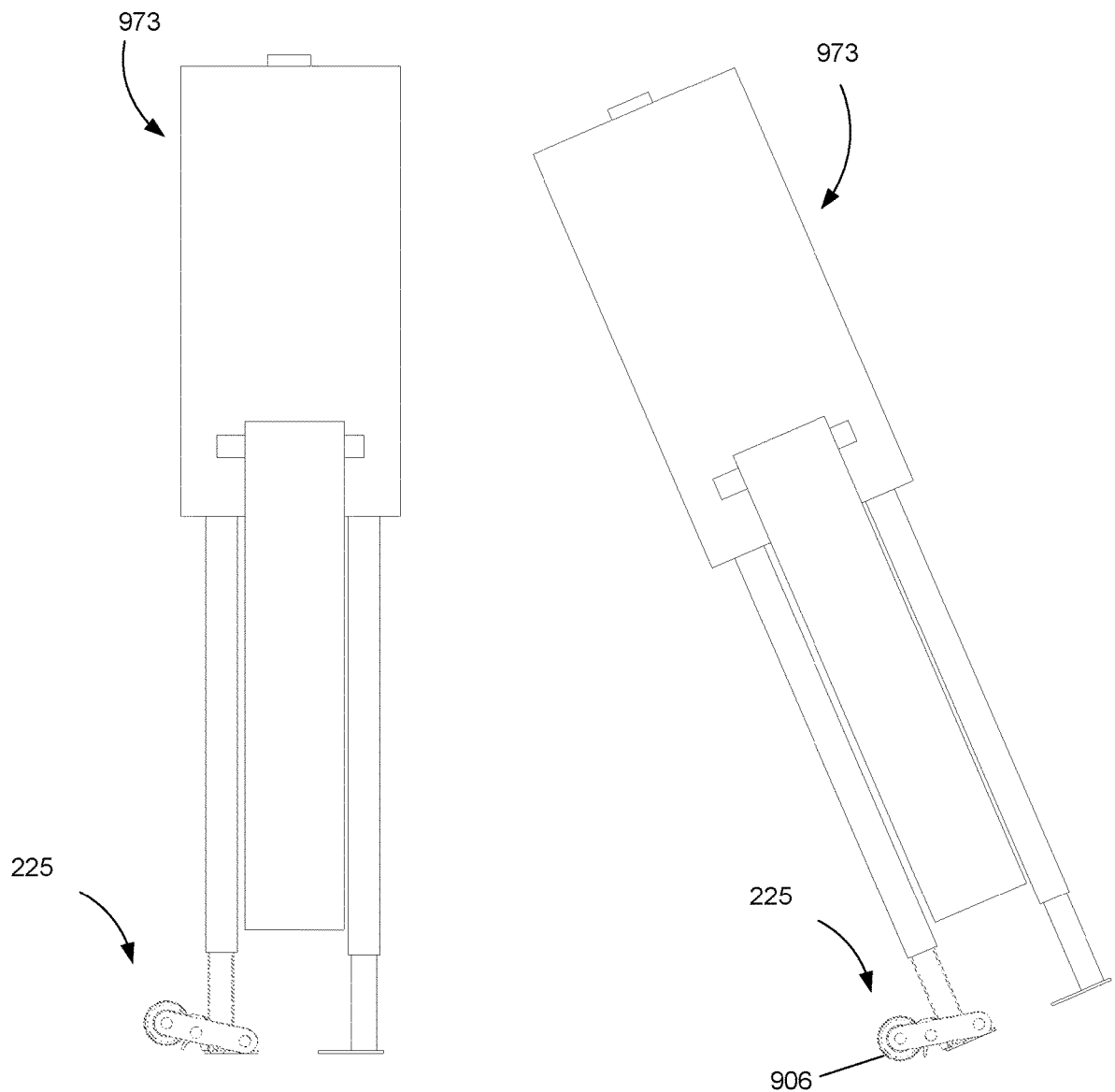

FIGS. 18D-18E show collapsed canopy 973 with wheeled mechanism 225. In FIG. 18E, the user has tilted collapsed canopy 973 and can now pull it to the left. Canopy 973 will roll easily on wheels 906 of wheeled mechanism 225.

Locking clip 910 can be disengaged from a locked position easily by pressing on tab 981 (FIG. 18B) so that locking clip 910 is no longer wedged against foot 908.

Fourth Preferred Embodiment

A fourth preferred embodiment of the present invention is shown in FIGS. 19A-31. In the fourth preferred embodiment wheeled mechanism 115 has been replaced with wheeled mechanism 255. Wheeled mechanism 255 included bias spring 295 (FIG. 20). Wheeled mechanism 255 attaches to the bottom of extendable legs 111 for two of the extendable legs to form two wheeled legs. As with the earlier embodiments, there are also two non-wheeled legs.

FIG. 19A shows a side view of collapsed, folded canopy 473. Wheeled mechanism 255 is facing rightward in the preferred position for storage and packing. However, to use wheeled mechanism 255 for mobility it must be positioned facing leftward.

As shown in FIGS. 19B and 20, spring 295 is connected between sliding spring bar 333 and the bottom edge of inner extendable leg 111. FIG. 20 shows a cutaway view of wheeled mechanism 255 and FIG. 21 shows a side view of wheeled mechanism 255.

Figure 22:
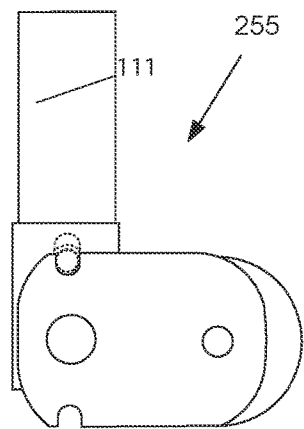
Figure 23A:
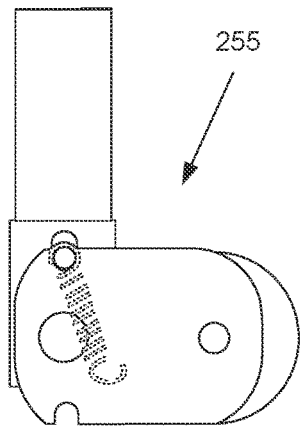
Figure 23B:
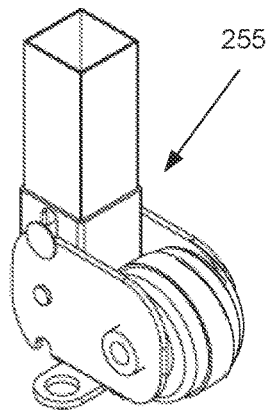

In FIGS. 22-23B, wheeled mechanism 255 is in position for storage and facing to the right. To utilize wheeled mechanism 255 for mobility the user needs to rotate wheeled mechanism 255 clockwise so that it is facing to the left.

Figure 24:
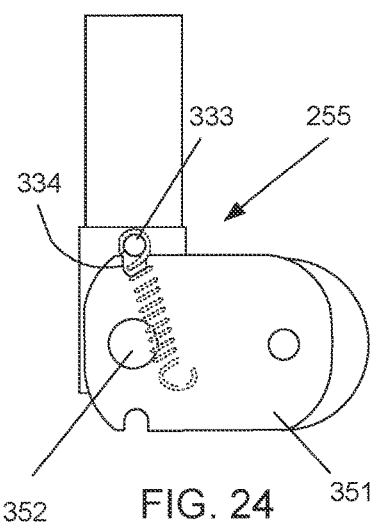

In FIG. 24 the user has slid spring bar 333 upwards so that it no longer engages slot 334 of wheel bracket 351. Wheel bracket 351 is now free to rotate about rotation axle 352.

Figure 25A:
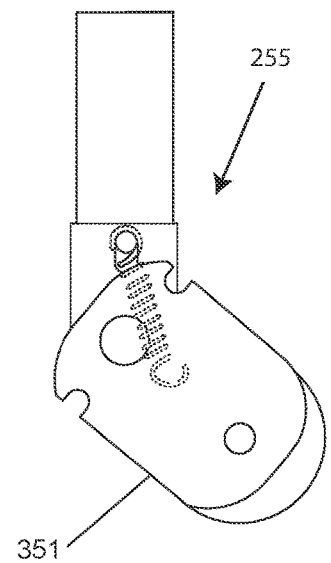
Figure 25B:
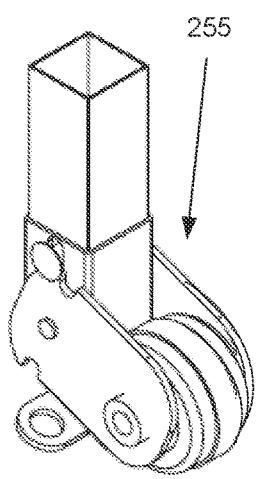

In FIGS. 25A-25B the user has started to rotate wheel bracket 351 clockwise.

Figure 26A:
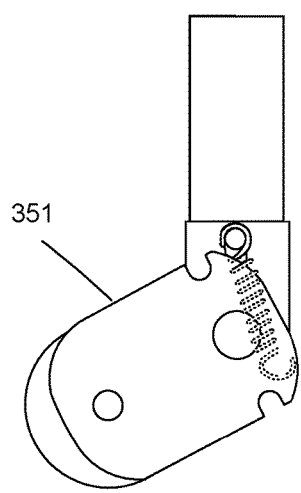
Figure 26B:
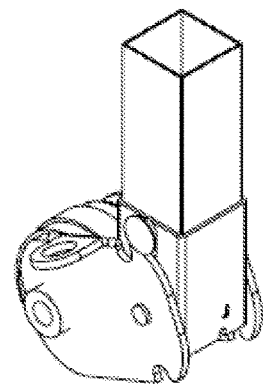

In FIG. 26A-26B the user has rotated wheel bracket 351 further clockwise.

Figure 27:
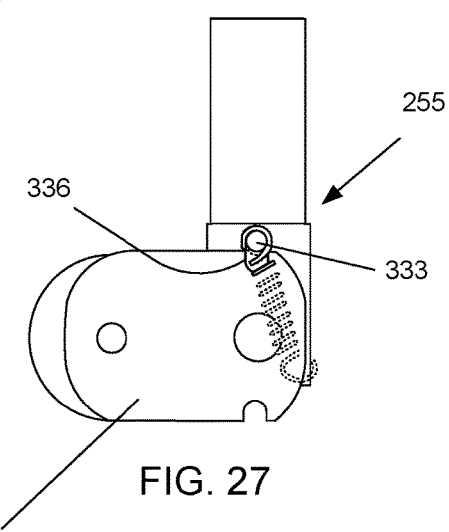

In FIG. 27 the user has rotated wheel bracket 351 clockwise so that it is facing to the left and slot 336 is underneath spring bar 333.

Figure 28:
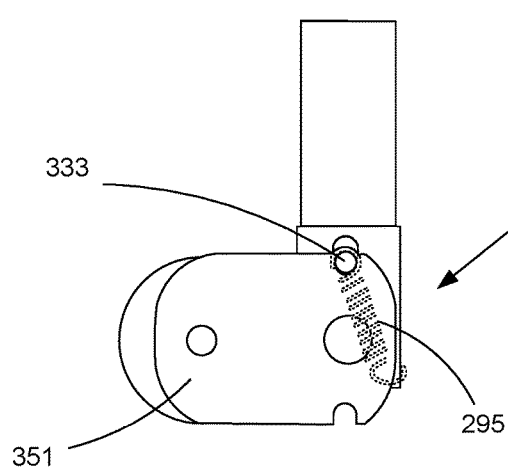
Figure 29:
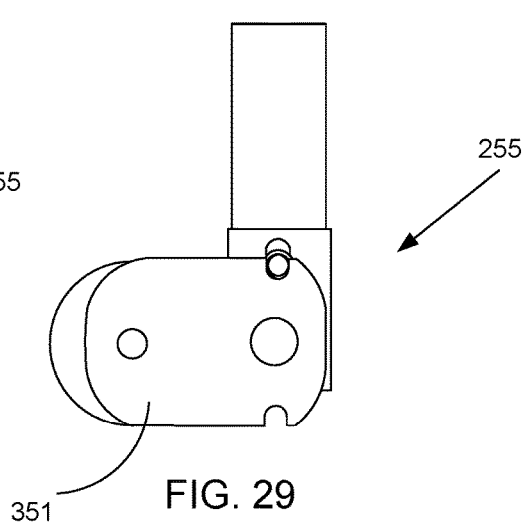

In FIGS. 28 and 29, the user has release spring bar 333 allowing spring 295 to pull spring bar 333 down into slot 336, thereby locking wheel bracket 351 in the left facing position shown.

In FIG. 30, wheel bracket 351 is facing left and ready to provide mobility for collapsed canopy 473.

In FIG. 31, the user has tilted collapsed canopy 473 and can now pull it to the left. Canopy 473 will roll easily on wheels 803 of wheeled mechanism 255.

Although the above-preferred embodiments have been described with specificity, persons skilled in this art will recognize that many changes to the specific embodiments disclosed above could be made without departing from the spirit of the invention. Therefore, the attached claims and their legal equivalents should determine the scope of the invention.

What is claimed is:

1. A wheeled collapsible canopy with foldable support frame and canopy fabric, comprising:
   A. at least two wheeled legs,
   B. at least two non-wheeled legs,
   C. a protective cover for covering the top of said collapsible canopy when said collapsible canopy is in a folded state, said protective cover extending only partially down said collapsible canopy, and wherein said at least two non-wheeled legs are extendable and may be locked into place to ensure said non-wheeled legs are equal in height to said wheeled legs and to allow said collapsible canopy to stand in said folded state,
   wherein said collapsible canopy is utilized for shade and shelter purposes when in an unfolded state and wherein said collapsible canopy is transportable when in said folded state,
   wherein each of said two wheeled legs and said two non-wheeled legs comprises:
   A. an outer leg connected to said support frame,
   B. an inner telescoping extendable leg connected to said outer leg, and
   C. a locking mechanism rigidly connected to the distal end of said outer leg, said locking mechanism for locking the position of said inner telescoping leg so that said two wheeled legs and said two non-wheeled legs are at equal height when said collapsible canopy is in said folded state, wherein said at least two wheeled legs each comprises a wheeled mechanism, wherein said wheeled mechanism is connected to said inner telescoping extendable leg and is sandwiched between and adjacent to and in contact with said locking mechanism and a horizontal foot pad.

2. The wheeled collapsible canopy as in claim 1, wherein said wheeled mechanism comprises:
   A. at least one wheel bracket, and
   B. at least one wheel rotatably connected to said wheel bracket.

3. The wheeled collapsible canopy as in claim 2, wherein said wheel bracket is rotatably attached.

4. The wheeled collapsible canopy as in claim 2, wherein said wheel bracket is non-rotatably attached.

5. The wheeled collapsible canopy as in claim 2, further comprising at least one pin or screw to connect said wheel bracket to said inner telescoping extendable leg, wherein said wheel bracket is immediately above said horizontal foot pad.

\* \* \* \* \*